United States Patent
Sierakowski et al.

(12)

(10) Patent No.: US 6,344,501 B1
(45) Date of Patent: Feb. 5, 2002

(54) NON-IONICALLY STABILIZED TRANSPARENT POWDER-COATING DISPERSION

(75) Inventors: Claudia Sierakowski, Griesheim; Karl-Heinz Grosse-Brinkhaus, Nottuln; Egon Wegner, Münster; Thomas Frey, Mannheim; Jörg Niemann; Joachim Woltering, both of Münster, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/646,947

(22) PCT Filed: Mar. 31, 1999

(86) PCT No.: PCT/EP99/02204

§ 371 Date: Oct. 23, 2000

§ 102(e) Date: Oct. 23, 2000

(87) PCT Pub. No.: WO99/50359

PCT Pub. Date: Oct. 7, 1999

(30) Foreign Application Priority Data

Apr. 1, 1998 (DE) .......................... 198 14 471
Mar. 20, 1999 (DE) .......................... 199 12 661

(51) Int. Cl.⁷ .......................... C08K 3/20; C08L 63/10
(52) U.S. Cl. .................. 523/410; 523/415; 525/123; 525/327.3; 525/386
(58) Field of Search .................. 523/415, 410; 525/123, 327.3, 386

(56) References Cited

U.S. PATENT DOCUMENTS

| 3,341,580 A | 9/1967 | Hechenbleikner ............ 260/541 |
| 3,477,990 A | 11/1969 | Dante .......................... 260/47 |
| 3,781,379 A | 12/1973 | Theodore ..................... 260/836 |
| 4,091,048 A | 5/1978 | Labana et al. ............... 260/836 |
| 4,268,542 A | 5/1981 | Sakakibara et al. ......... 427/195 |
| 4,939,213 A | 7/1990 | Jacobs, III et al. ....... 525/329.9 |
| 5,084,541 A | 1/1992 | Jacobs, III et al. ............ 528/45 |
| 5,965,213 A | * 10/1999 | Sacharski et al. ............ 427/475 |
| 6,159,556 A | * 12/2000 | Möller et al. ................ 427/475 |

FOREIGN PATENT DOCUMENTS

| BE | 75 66 93 | 3/1971 | |
| DE | 22 14 650 B2 | 3/1972 | |
| DE | 27 49 576 B2 | 11/1977 | ......... C08F/220/18 |
| DE | 38 25 278 A1 | 7/1988 | ............ B05D/7/24 |
| DE | 195 40 977 A1 | 11/1995 | ............ C09D/5/46 |
| DE | 196 13 547 A1 | 4/1996 | ............ C09D/5/46 |
| DE | 196 18 657 A1 | 5/1996 | ............ C09D/5/46 |
| EP | 0228 003 B2 | 12/1986 | ............ C08G/18/08 |
| EP | 0 299 420 A2 | 7/1988 | ............ C09D/3/58 |
| EP | 0 624 577 A1 | 5/1994 | ......... C07D/215/70 |
| EP | WO 96/32452 | 10/1996 | ......... C09D/144/06 |
| EP | WO 98/27141 | 6/1998 | ............ C08J/3/00 |
| EP | WO 99/01499 | 1/1999 | ............ C08J/3/12 |

* cited by examiner

*Primary Examiner*—Robert Dawson
*Assistant Examiner*—D. Aylward

(57) ABSTRACT

The present invention relates to an aqueous powder clearcoat dispersion comprising a solid pulverulent component A and an aqueous component B, where component A is a transparent powder coating material comprising
  a) at least one epoxy binder containing from 25 to 45% by weight, preferably from 25 to 35% by weight, of glycidyl-containing monomers, with or without a fraction of vinylaromatic compounds, preferably styrene,
  b) at least one crosslinking agent, preferably straight-chain, aliphatic dicarboxylic acids and/or carboxy-functional polyesters, and
  c) if desired, catalysts, auxiliaries, additives typical for transparent powder coating materials, such as devolatilizers, leveling agents, UV absorbers, free-radical scavengers, and antioxidants, and component B is an aqueous dispersion comprising
  a) at least one nonionic thickener and
  b) if desired, catalysts, auxiliaries, defoamers, wetting agents, antioxidants, UV absorbers, free-radical scavengers, biocides, small amounts of solvent, leveling agents, neutralizing agents, preferably amines, and/or water retention agents, and
  c) a dispersant medium in the form of a nonionic polyurethane dispersion.

16 Claims, No Drawings

NON-IONICALLY STABILIZED TRANSPARENT POWDER-COATING DISPERSION

The present invention relates to a nonionically stabilized powder clearcoat dispersion particularly suitable as a coating for automobile bodies coated with aqueous basecoat.

For the coating of automobile bodies, preference is currently given to the use of liquid coating materials. These cause numerous environmental problems owing to their solvent content. The same applies to cases where aqueous coating materials are employed.

For this reason, increased efforts have been made in recent years to use powder coating materials for the coating operation. The results so far, however, have not been satisfactory; in particular, increased coat thicknesses are necessary in order to achieve a uniform appearance. On the other hand, the use of pulverulent coating materials entails a different application technology. The plants designed for liquid coating materials cannot, therefore, be used for this purpose. Consequently, attempts are being made to develop powder coating materials in the form of aqueous dispersions which may be processed using liquid coating technologies.

U.S. Pat. No. 4,268,542, for example, discloses a process using a powder coating slurry which is suitable for coating automobiles. In this process, a conventional powder coat is first applied to the body, and the clearcoat slurry is applied as the second coat. With this clearcoat slurry, based on acrylate resins, ionic thickeners are used. Moreover, in one of the examples, they include from 0.5 to 30% of glycidyl-containing monomers. Moreover, it is necessary to operate at high baking temperatures (more than 160° C.).

DE-A 196 13 547 discloses an aqueous powder coating dispersion which meets the specified requirements. However, following application and crosslinking, the powder clearcoat dispersion described therein, like the solid transparent powder coating materials known to date, exhibits poor values in respect of its incipient etch stability with respect to water, tree resin, and sulfuric acid. Moreover, the system displays a tendency to yellow.

Unpublished German Patent Application 19518392.4, furthermore, discloses a powder clearcoat dispersion composed of two components. The first component comprises epoxy binder, crosslinking agents, and also catalysts, auxiliaries, and additives. The second component is a nonionic thickener, which is present if desired in a mixture with catalysts, auxiliaries, defoamers, wetting agents, antioxidants, UV absorbers, free-radical scavengers, biocides, solvents, leveling agents, and neutralizing agents. Dispersion auxiliaries used are preferably carboxy-functional dispersants.

The transparent powder coating materials to date have generally contained dispersants based on ionically stabilized polymers. In the case of wet-on-wet application, these lead to cracking in the clearcoat. Additional difficulties are the sedimentation tendency and the pumpability of the paint dispersion.

In the text below, the term powder clearcoat dispersion is used synonymously with powder clearcoat slurry.

The present invention has now set itself the object of providing an aqueous powder clearcoat dispersion which may be applied to automobile bodies with the existing liquid coating technology, which in particular may be baked at temperatures of just 130° C., and which does not lead, especially after wet-on-wet application, to cracking in the clearcoat.

This object is achieved by means of an aqueous powder clearcoat dispersion comprising a solid pulverulent component A and an aqueous component B, where component A is a transparent powder coating material comprising
a) at least one epoxy binder containing from 25 to 45%, preferably from 30 to 35%, of glycidyl-containing monomers, with or without a fraction of vinylaromatic compounds, preferably styrene,
b) at least one crosslinking agent, preferably straight-chain, aliphatic dicarboxylic acids, carboxy-functional polyesters and/or tris (alkoxycarbonylamino)triazine, and
c) if desired, catalysts, auxiliaries, additives typical for transparent powder coating materials, such as devolatilizers, leveling agents, UV absorbers, free-radical scavengers, and antioxidants, and component B is an aqueous dispersion comprising
a) at least one nonionic thickener and
b) if desired, catalysts, auxiliaries, defoamers, dispersion auxiliaries, wetting agents, antioxidants, UV absorbers, free-radical scavengers, small amounts of solvent, leveling agents, biocides and/or water retention agents, and
c) a dispersant medium in the form of a nonionic polyurethane dispersion.

Preference is given in accordance with the invention to the following proportions:

Component A
a) 60–80 parts
b) 15≈30 parts
c) 3–10 parts

Component B
20–50 parts of component a
80–50 parts of component b
20–50 parts of component c
1000–5000 parts of distilled water The dispersion preferably contains
25–100 parts of component A
100 parts of component B Suitable epoxy-functional binders for the solid transparent powder coating material used to prepare the dispersion are, for example, polyacrylate resins which contain epoxide groups and are preparable by copolymerizing at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid. Polyacrylate resins of this kind containing epoxide groups are known, for example, from EP-A-299 420, DE-B-22 14 650, DE-B-27 49 576, U.S. Pat. Nos. 4,091,048 and 3,781,379.

Examples of ethylenically unsaturated monomers which contain no epoxide group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxide groups in the molecule are acid amides, such as acrylamide and methacrylamide, vinylaromatic compounds, such as styrene, methylstyrene and vinyltoluene, nitriles, such as acrylonitrile and methacrylonitrile, vinyl and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The polyacrylate resin containing epoxide groups normally has an epoxide equivalent weight of from 400 to 2500, preferably from 420 to 700, a number-average molecular weight (determined by gel permeation chromatography using a polystyrene standard) of from 2000 to 20,000, preferably from 3000 to 10,000, and a glass transition temperature ($T_g$) of from 30 to 80, preferably from 40 to 70, with particular preference from 40 to 60° C. (measured by means of differential scanning calorimetry (DSC)). Very particular preference is given to around 50° C. Mixtures of two or more acrylate resins may also be employed.

The polyacrylate resin containing epoxide groups may be prepared by addition polymerization in accordance with widely known methods.

Suitable crosslinkers are carboxylic acids, especially saturated, straight-chain, aliphatic dicarboxylic acids having 3 to 20 carbon atoms in the molecule. Very particular preference is given to the use of 1,12-dodecanedioic acid. To modify the properties of the finished powder clearcoats it is possible if desired to use other crosslinkers containing carboxyl groups. Examples thereof that may be mentioned include branched or unsaturated straight-chain dicarboxylic and polycarboxylic acids, and also polymers containing carboxyl groups.

As crosslinkers it is also possible to employ tris(alkoxycarbonylamino)triazines in accordance with U.S. Pat. Nos. 4,939,213, 5,084,541, and EP 0 624 577.

These are tris(alkoxycarbonylamino)triazines of the formula

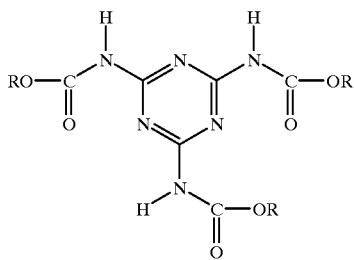

where R is methyl, butyl or ethylhexyl. It is also possible to use derivatives of said compounds.

Preference is given in accordance with the invention to the methyl/butyl mixed esters, which have the advantage over the straight methyl esters of improved solubility in polymer melts, and to butyl/ethylhexyl mixed esters. Preference is also given, in accordance with the invention, to the straight butyl esters.

The tris(alkoxycarbonylamino)triazines and their derivatives may, in accordance with the invention, also be used in a mixture of conventional crosslinking agents (component C). Particularly suitable in this instance are blocked polyisocyanates other than the tris(alkoxy-carbonylamino)triazines.

It is also possible to use amino resins, e.g., melamines. In principle, it is possible to use any amino resin suitable for transparent topcoats, or a mixture of such amino resins.

All crosslinkers mentioned may be used individually or in any desired combinations with one another.

Also suitable, furthermore, are transparent powder coating materials comprising an epoxy-functional crosslinker and an acid-functional binder.

Suitable acid-functional binders are, for example, acidic polyacrylate resins, which are preparable by copolymerizing at least one ethylenically unsaturated monomer containing at least one acid group in the molecule with at least one further ethylenically unsaturated monomer containing no acid group in the molecule.

The epoxy binder or, respectively, the epoxy crosslinker and the carboxy binder or, respectively, carboxy crosslinker are usually used in an amount such that there are from 0.5 to 1.5, preferably from 0.75 to 1.25, equivalents of carboxyl groups per equivalent of epoxide groups. The amount of carboxyl groups present may be determined by titration with an alcoholic KOH solution.

In accordance with the invention, the binder comprises vinylaromatic compounds, especially styrene. In order to limit the risk of cracking, however, the amount is not more than 35% by weight. Preference is given to from 10 to 25% by weight.

The solid powder coating materials may contain one or more suitable catalysts for the epoxy resin curing. Suitable catalysts are phosphonium salts of organic or inorganic acids, quaternary ammonium compounds, amines, imidazole, and imidazole derivatives. The catalysts are generally used in amounts of from 0.001% by weight to about 2% by weight, based on the overall weight of the epoxy resin and of the crosslinking agent.

Examples of suitable phosphonium catalysts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutyl-phosphonium bromide, and tetrabutylphosphonium acetate-acetic acid complex. These and further suitable phosphonium catalysts are described, for example, in U.S. Pat. Nos. 3,477,990 and 3,341,580.

Examples of suitable imidazole catalysts are 2-styrylimidazole, 1-benzyl-2-methylimidazole, 2-methylimidazole, and 2-butylimidazole. These and other imidazole catalysts are described, for example, in Belgian Patent No. 756,693.

Furthermore, the solid powder coating materials may include auxiliaries and additives. Examples are leveling agents, antioxidants, UV absorbers, free-radical scavengers, flow aids, and devolatilizers, such as benzoin, for example.

Suitable leveling agents are those based on polyacrylates, polysiloxanes, and/or fluoro compounds.

Antioxidants which may be used are reducing agents such as hydrazines and phosphorus compounds, and also free-radical scavengers, e.g., 2,6-di-tert-butylphenol derivatives.

UV absorbers which may be used are preferably triazines and benzotriphenol.

Free-radical scavengers which may be used are preferably 2,2,6,6-tetramethylpiperidine derivatives.

The component B comprises a nonionic thickener a). Examples thereof are modified celluloses, and polyurethane thickeners.

Structural features of such associative thickeners a) are:
aa) a hydrophilic framework which ensures sufficient solubility in water, and
ab) hydrophobic groups capable of an associative interaction in the aqueous medium.

Examples of hydrophobic groups used are long-chain alkyl radicals, such as dodecyl, hexadecyl or octadecyl radicals, or alkaryl radicals, such as octylphenyl or nonylphenyl radicals, for example.

Hydrophilic frameworks used are preferably polyacrylates, cellulose ethers or, with particular preference, polyurethanes containing the hydrophobic groups as polymer building blocks.

Very particular preference as hydrophilic frameworks is given to polyurethanes containing polyether chains as building blocks, preferably comprising polyethylene oxide.

In the synthesis of such polyether polyurethanes, the diisocyanates and/or polyisocyanates, preferably aliphatic diisocyanates, with particular preference optionally alkyl-substituted 1,6-hexamethylene diisocyanate, serve to link the hydroxyl-terminated polyether building blocks to one another and to link the polyether building blocks with the hydrophobic end-group building blocks, which may, for example, be monofunctional alcohols and/or amines having the abovementioned long-chain alkyl radicals or aralkyl radicals.

As is known, the nonionic associative thickeners are designed, by virtue of the configuration of their hydrophobic groups, such that they are able to develop hydrophobe/hydrophobe interactions both to the solid particles present in the powder coating dispersion and with one another. By this means, a three-dimensional network is built up and controlled. Furthermore, the associative thickeners must contain sufficient hydrophilic groups that they are dispersed homogeneously in the water and there is no phase separation from the water. Examples of suitable nonionic associative thickeners and their mechanism of action are described in detail in the text book "Lackadditive" by Johan Bieleman, Wiley-VCH, Weinheim, New York, 1998.

Moreover, the component B may include catalysts, leveling agents, antioxidants, UV absorbers, free-radical scavengers, and wetting agents. Essentially, the appropriate substances here are those already listed for component A.

Furthermore, auxiliaries, defoamers, biocides, solvents and neutralizing agents may be added to component B.

Suitable defoamers are preferably modified polysiloxanes.

Neutralizing agents which can be used are amines, ammonia, and metal hydroxides.

Essential to the invention, finally, is the addition of the dispersion medium c). This comprises compounds based on polyurethanes.

The nonionic dispersants c) in the form of a polyurethane dispersion that are essential to the invention differ from the nonionic associative thickeners in two respects:
1. The hydrophobic groups of the dispersants c) are designed so that, preferably, hydrophobe/hydrophobe contacts are developed with the particles present in the powder coating dispersion, with the result that there is no formation of a three-dimensional network as is typical for the associative thickeners.
2. The hydrophilicity is reduced. The number of hydrophilic groups present in the dispersant c) is only sufficient that the particles are enveloped and shielded by the hydrophilic structural elements. The action of the hydrophilic structural elements is not so strong that they are able to detach the hydrophobic structural elements from the particles and bring them into the aqueous phase. Apparently, the comparatively low hydrophilicity is manifested in the formation of a second phase in water through the dispersants per se.

The polyurethane resins c) used in accordance with the invention preferably comprise
1. at least one organic component having at least two reactive hydrogen atoms,
2. a monofunctional ether, and
3. a polyisocyanate.

The organic component of the polyurethane composition c) comprises a polyesterpolyol, a low molecular mass diol and/or triol, or mixtures thereof. If desired, a trifunctional monomer containing hydroxyl groups may be used.

In a second preferred embodiment, the polyurethane c) comprises
1. at least one organic component having at least two reactive hydrogen atoms,
2. a nonionic stabilizer, i.e., a nonionic dispersant c), prepared by reacting
   i. a monofunctional polyether with a polyisocyanate-containing component, to produce an isocyanate intermediate, and
   ii. a component having at least one active amine group and at least two active hydroxyl groups, and
3. at least one polyisocyanate-containing component.

The organic component preferably comprises a polyetherpolyesterpolyol, a low molecular mass diol and/or triol, or mixtures thereof.

The polyester component may be prepared by reacting at least one dicarboxylic acid and at least one alcohol component, the alcohol containing at least two hydroxyl groups. The carboxylic acid component comprises two or more carboxyl groups. Examples of suitable dicarboxylic acids are dimeric fatty acids and cycloaliphatic dicarboxylic acids such as isophthalic acid.

In addition to the carboxylic acids, the polyester resin may also comprise one or more low molecular mass diols or triols. In principle, any polyol may be used.

The polyester resins, or mixtures of polyester resins, that are used preferably contain terminal hydroxyl groups. This is brought about by adding an excess of polyols.

The polyesters may be synthesized using both monocarboxylic acids and monoalcohols. Preferably, however, the monocarboxylic acids and/or monoalcohols are present in the polyester resin in a very small amount by weight.

The polyester diol components preferably used comprise between 20 and 80% by weight of the polyurethane resin. Preferably, the amounts are between 50 and 70% by weight. Very particular preference is given to from 55 to 65% by weight.

The polyurethane c) is prepared using polyesterpolyols having a molecular weight of between 500 and 5000.

Preference is given to molecular weights of between 1000 and 3500.

In addition to the polyesterdiols, the polyurethane resins may include further organic components having at least two reactive hydrogen atoms. These comprise, preferably, diols and triols, thiols and/or amines, or mixtures of these substances. The components used to synthesize the polyester component may also be used as separate components in this case. In other words, dialcohols or trialcohols, such as neopentyl glycol or 1,6-hexanediol or trimethylolpropane, for example, are also suitable as an additional organic component in the polyurethane.

The molecular weight of the diols and/or triols used in the polyurethane resin is between 0 and 20% by weight. Preference is given to from 1 to 6% by weight.

The polyurethane resin further comprises polyisocyanates, especially diisocyanates. The isocyanates are situated at between 5 and 40% by weight, based on the polyurethane mass. Particular preference is given to from 10 to 30% by weight and very particular preference to from 10 to 20% by weight. To prepare the polyurethane, finally, a monofunctional polyether is used.

In a second variant, a nonionic stabilizer c) is prepared in which, preferably, a monofunctional polyether is reacted with a diisocyanate. The resultant reaction product is then reacted with a component containing at least one active amine group and at least two active hydroxyl groups.

In one particular embodiment, the polyurethane c) comprises a reaction product of:
1. a polyesterpolyol, in turn a reaction product of a carboxylic acid having at least two carboxyl groups and a component having at least two hydroxyl groups, 2. at least one low molecular mass component having at least two hydroxyl groups,
3. at least one polyisocyanate-containing component,
4. a nonionic stabilizer prepared by reacting a monofunctional ether with a polyisocyanate and then reacting the resultant reaction product with a component containing at least one active amine group and at least two active hydroxyl groups.

In a fourth variant, the polyurethane c) comprises a reaction product of
1. a polyesterpolyol,
2. at least one low molecular mass diol or triol,
3. a polyisocyanate,
4. a monomer containing trihydroxy groups,
5. a monofunctional polyether containing hydroxy groups.

The polyesters are synthesized using the above-described carboxylic acid components and an excess of polyols. The excess of polyols is chosen so that preferably terminal hydroxyl groups are formed. The polyols preferably have a hydroxyl functionality of at least two.

The polyester resin consists preferably of one or more polyols, preferably of a diol. Diols used with preference are alkylene glycols, such as ethylene glycol, propylene glycol, butylene glycol and neopentyl glycol, 1,6-hexanediol or other glycols, such as bisphenol A, cyclohexanedimethanol, caprolactonediol, hydroxyalkylated bisphenol, and similar compounds.

The low molecular mass diols preferably used in accordance with the invention are known from the prior art. They include aliphatic diols, preferably alkylenepolyols having 2 to 18 carbon atoms. Examples thereof are 1,4-butanediol, cycloaliphatic diols, such as 1,2-cyclohexanediol and cyclohexanedimethanol.

Suitable organic polyisocyanates in accordance with the invention are preferably those containing at least two isocyanate groups. Preference is given in particular to diisocyanates, e.g., p-phenylene diisocyanate, biphenyl 4,4'-diisocyanate, toluene diisocyanate, 3,3'-dimethyl-4,4'-biphenylene diisocyanate, 1,4-tetramethylene diisocyanate, 1,6-hexamethylene diisocyanate, 2,2,4-trimethylhexane 1,6-diisocyanate, methylenebis(phenyl isocyanate), 1,5-naphthalene diisocyanate, bis(isocyanatoethyl fumarate), isophorone diisocyanate, and methylenebis(4-cyclohexyl isocyanate).

In addition to the abovementioned diisocyanates, other polyfunctional isocyanates are also used. Examples are benzene 1,2,4-triisocyanate and polymethylenepolyphenyl isocyanates.

Particular preference is given to the use of aliphatic diisocyanates, e.g., 1,6-hexamethylene diisocyanate, 1,4-butylene diisocyanate, methylenebis(4-cyclohexyl isocyanate), isophorone diisocyanate, and 2,4-toluene diisocyanate.

Longer-chain polyurethane resins c) may be obtained by chain extension with components containing diol and/or triol groups. Particular preference is given to chain extenders having at least two active hydrogen groups, e.g., diols, thiols, diamines or mixtures of these substances, examples being alkanolamines, aminoalkyl mercaptans, hydroxyalkyl mercaptans, and similar compounds.

Examples of diols used as chain extenders are 1,6-hexanediol, cyclohexanedimethylol, and 1,4-butanediol. A particularly preferred diol is neopentyl glycol.

The polyethers used in accordance with the invention are preferably mono- or difunctional polyethers. The monofunctional polyethers include, for example, those prepared by addition polymerization of ethylene oxides, propylene oxides or mixtures thereof. An example of a suitable polyether is methoxypolyethylene glycol, sold under the brand name Carbowax® MPEG 2000 by the company Union Carbide Chemicals.

The polyurethane product c) described may be mixed with conventional crosslinkers. These include preferably amino resins, e.g., melamine. It is also possible to use condensation products of other amines and amides, examples being aldehyde condensates of triazines, diazines, triazols, guanidines, guanamines, or alkyl and aryl-substituted derivatives of such components. Some examples of such components are N,N'-dimethylurea, dicyandiamide, 2-chloro-4,6-diamino-1,3,5-triazine, 6-methyl-2,4-diamino-1,3,5-triazine, 3,5-diaminotriazole, triaminopyrimidines, 2-mercapto-4,6-diaminopyrimidine, 2,4,6-triethyltriamino-1,3,5-triazine, and similar substances.

Suitable aldehydes include, preferably, formaldehyde. It is likewise possible to use acetaldehyde, crotonaldehyde, acrolein, benzaldehyde, and furfural.

The amine-aldehyde condensation products may contain methylol or similar alcohol groups. Examples of alcohols that may be used are methanol, ethanol, propanol, butanol, pentanol, hexanol, heptanol, benzyl alcohol, and aromatic alcohols, cyclic alcohols, such as cyclohexanol, monethers or glycols, and also substituted alcohols, e.g., 3-chloropropanol.

In addition to the abovementioned isocyanates, it is also possible in accordance with the invention to use blocked polyisocyanates as crosslinking agents. Examples thereof include organic polyisocyanates such as trimethylene, tetramethylene, hexamethylene, 1,2-propylene, 1,2-butylene, and 2,3-butylene diisocyanates. It is also possible to use cycloalkane components such as 1,3-cyclopentane, 1,4-cyclohexane and 1,2-cyclohexane diisocyanates. Furthermore, aromatic components such as phenylene, p-phenylene, 4,4'-biphenyl, 1,5-naphthalene and 1,4-naphthalene diisocyantes may be used. Moreover, aliphatic-aromatic components such as 4,4'-diphenylenemethane, 2,4- or 2,6-tolylene or mixtures thereof, 4,4'-toluidine and 1,4-xylylene diisocyanates are suitable. Further examples are ring-substituted aromatic components such as 4,4'-diphenyl ether diisocyanate and chlorodiphenylene diisocyanates. Triisocyanates which can be used are triphenylmethane 4,4', 4"-triisocyanate, 1,3,5-triisocyanatobenzene, and 2,4,6-triisocyanatotoluene. Tetra-isocyanates which can be used, finally, include 4,4'-diphenyldimethylmethane 2,2',5,5'-tetraisocyanate.

As blocking agents it is possible to use aliphatic, cycloaliphatic, and aromatic alcohol monoalcohols. These include, for example, methyl, ethyl, chloroethyl, propyl, butyl, cyclohexyl, heptyl, octyl, nonyl, 3,3,5-trimethylhexanol, decyl and lauryl alcohols. As phenolic components it is possible, for example, to use phenols or substituted phenols. Examples thereof are cresol, xylenol, nitrophenol, chlorophenol, ethylphenol, 1-butylphenol, and 2,5-di-t-butyl-4-hydroxytoluene.

Further suitable blocking agents are tertiary hydroxylamines, e.g., diethylethanolamine, and oximes, such as methyl ethyl ketone oxime, acetone oxime, and cyclohexanone oxime.

The described crosslinking agents are present in the polyurethane dispersion c) in amounts of from 2 to 15% by weight, preferably from 4 to 8% by weight.

The polyurethane dispersion c) obtained is present in the powder slurry with a proportion of from 0.5 to 20% by weight, preferably from 2 to 15% by weight.

The preparation of the solid powder coating materials takes place in accordance with known methods (cf., e.g., product information bulletin from BASF Lacke+Farben AG, "Pulverlacke", 1990) by homogenization and dispersion, by means for example of an extruder, screw compounder and the like. Following preparation of the powder coating materials, they are prepared by grinding and, if appropriate, by classifying and sieving for dispersion.

Subsequently, the aqueous powder clearcoat dispersion may be prepared from the powder by wet milling or by stirred incorporation of dry-milled powder coating material. Particular preference is given to wet milling.

The present invention accordingly also provides a process for preparing an aqueous powder coating dispersion on the basis of the described component A, which in accordance with the invention is dispersed in the component B.

Following the dispersion of component A in component B, milling is carried out if desired, the pH is adjusted to from 4.0 to 7.0, preferably from 5.5 to 6.5, and the dispersion is filtered.

The average particle size is between 1 and 25 µm, preferably below 20 µm. Particular preference is given to from 3 to 10 µm. The solids content of the aqueous powder clearcoat dispersion is between 15 and 50%.

Before or after the wet milling and/or the introduction of the dry powder coating material into the water, the dispersion may be admixed with from 0 to 5% by weight of a defoamer mixture, an ammonium and/or alkali metal salt, a carboxyl-functional or nonionic dispersing auxiliary, wetting agent, and/or thickener mixture, and with the other additives. Preferably, in accordance with the invention, defoamer, dispersing auxiliary, wetting agent and/or thickener are first of all dispersed in water. Then small portions of the transparent powder coating material are stirred in. Subsequently, defoamer, dispersing auxiliary, thickener and wetting agent are again incorporated by dispersion. Finally, again in small portions, transparent powder coating materials are stirred in.

In accordance with the invention, the pH is adjusted using preferably ammonia or amines. In this case the pH may initially rise, so giving a strongly basic dispersion. However, within a few hours or days, the pH drops back to the levels indicated above.

Another variant for preparing the powder clearcoat dispersion of the invention comprises mixing a liquid melt of the binders and crosslinkers and, if desired, of the additives c) of component A, introducing the mixture into an emulsifying apparatus, preferably with the addition of water and stabilizers, and cooling and filtering the resultant emulsion.

In order to be able to achieve a high quality of mixing, it is essential to carry out mixing solvent-free in the melt. Accordingly, the polymeric components are fed into the dispersing apparatus in the form of viscous resin melts.

For this purpose, binders and crosslinkers must be melted. The ratio of crosslinkers to binders is from 0.6 to 1:1.4, preferably from 0.8:1 to 1:1.2. Crosslinkers and binders are preferably heated in separate containers. The temperature is selected so that both components are melted and their viscosity permits further processing, especially conveying. The higher the temperature of the melt, the lower the viscosity, and the greater the qualities of mixing achievable. However, it is necessary largely to rule out a crosslinking reaction. The crosslinking reaction proceeds much more quickly at higher temperatures. Consequently, there is only a narrow temperature/time window within which the residence time available before cooling is sufficiently long, and at the same time effective emulsification is possible. In order to utilize this window as efficiently as possible, the binder and crosslinker melts are not brought together until directly upstream of the mixing zone.

Prior to the conveying of the components through the installation, this installation may be heated, preferably with steam, to the desired process temperature. Subsequently, the melted binder/additive mixture and the crosslinker melt are conveyed through the entire unit, in preferably separate, heated feedlines with pumps, and metered into a mixer. A stoichiometric ratio of binder/additive mixture and crosslinker melt may be set by way of the volume flow of the conveying pumps.

Subsequently, the liquid mixture is immediately emulsified in water. In this case, an emulsifier is added to the organic phase and/or to the water. In the case where an aqueous emulsifier/stabilizer solution is used, heating is carried out under pressure to a temperature in the vicinity of the mixing temperature, and the liquid binder/crosslinker mixture is emulsified therein.

Mixing and emulsifying may be realized in two separate machines or in one multistage machine. The second solution has distinct advantages on grounds of crosslinking, since in this case the residence time at the high temperatures is minimized. Any organic solvent present may subsequently be separated off from the aqueous phase directly by vacuum distillation at low temperatures.

Following the emulsification, a cooling operation is carried out immediately. This must be realized in such a way that, firstly, there is no sticking of the disperse resin particles and, secondly, the residence time up to the point in time at which a crosslinking reaction is no longer able to take place is as short as possible. This aim may be achieved, for example, through using a heat exchanger, cooling by injecting cold water, or by spraying the emulsion into cold water.

In order to rule out crosslinking reactions during the mixing, emulsifying and cooling phase, the residence time from the beginning of the mixing phase to the end of the cooling phase must be kept as short as possible. It is less than 5 s, preferably less than 1 s. Consequently, continuous processes are preferred. For this purpose use is made of machines such as rotor-stator dispersing apparatus (toothed colloid or wet rotor mills, toothed-wheel dispersing machines, intensive mixers) and also static mixers.

For subsequent emulsification in water, the binder/crosslinker mixture may be sprayed in water and/or in component B. If sufficient finenesses are not achieved, rotor-stator units or static mixers may again be used. A further increase in the local energy input is possible through the above-described use of a high-pressure homogenizer. In this case the emulsion is pressed through fine apertures at pressures in the range of 100–1500 bar, preferably from 100 to 1000 bar, especially from 100 to 200 bar, which leads to a marked reduction in the droplet size and thus to a greater stability of the emulsion during storage.

The micronization variants presented lead to solvent-free dispersions having the average particle sizes in the range of 100–10,000, preferably from 150 to 6000, with particular preference from 400 to 4000, with special preference 600–3500 nm, and are therefore even finer than the aqueous dispersions (particle size 3–20 µm) preparable by wet milling of powder coating materials in accordance with the prior art.

With the process described it is possible to prepare fine polymer dispersions whose molecular weights lie within the range from 1000 to 20,000, preferably from 1000 to 10,000, with particular preference from 1500 to 6000, most preferably from 1500 to 4000 g/mol.

The powder clearcoat dispersion of the invention may be used as a coating over basecoats, preferably in the automotive industry. The clearcoat dispersion is particularly suitable for aqueous basecoats based on a polyester, on polyurethane resin and on an amino resin.

The powder clearcoat dispersions of the invention may be applied with the methods known from liquid coating technology. In particular, they may be applied by means of spraying techniques.

The powder clearcoat dispersions applied to the basecoat film are generally flashed off prior to baking. This is done judiciously first at room temperature and then at slightly elevated temperature. In general, the elevated temperature is from 40 to 70° C., preferably from 50 to 65° C. Flashing off is carried out for from 2 to 10 minutes, preferably from 4 to 8 minutes, at room temperature. At elevated temperature, flashing off is repeated for the same length of time.

Baking may be carried out at temperatures of just 130° C. Baking may be carried out at from 130 to 180° C., preferably from 135 to 155° C.

Using the process of the invention it is possible to achieve film thicknesses of from 30 to 50, preferably from 35 to 45 $\mu$m. Hitherto, in accordance with the prior art, clearcoats of comparable quality using transparent powder coating materials were achievable only by applying film thicknesses of from 65 to 80 $\mu$m.

In the text below, the invention is described more closely with reference to the examples:

A. Preparing the Pulverized Resin 21.1 p xylene are introduced initially and heated to 130° C. To this initial charge there are added at 130° C. over the course of 4 h, via two separate feed vessels, initiator: 4.5 p TBPEH (tert-butyl perethylhexanoate) mixed with 4.86 p xylene, and monomers:

10.78 p methyl methacrylate, 26.5 p n-butyl methacrylate, 17.39 p styrene and 22.95 p glycidyl methacrylate. The mixture is subsequently heated to 180° C. and the solvent is stripped off in vacuo <100 mbar.

B. Preparing the Transparent Powder Coating Material 77.5 p of acrylate resin, 18.8 p of dodecanedioic acid (a. curing agent), 2 p of Tinuvin 1130 (UV absorber), 0.9 p Tinuvin 144 (HALS), 0.4 p Additol XL 490 (leveling agent) and 0.4 p benzoin (devolatilizer) are intimately mixed on a Henschel fluid mixer, the mixture is extruded on a BUSS PLK 46 extruder, the extrudate is ground on a Hosokawa ACM 2 mill, and the ground material is sieved off through a 125 $\mu$m sieve.

C. Nonionically Stabilized Powder Slurry

1. PREPARATION EXAMPLE

1.1 Preparing a Polyester Precursor 40.71 parts by weight of Pripol 1013 (commercial dimer fatty acid from Unichema), 22.413 parts by weight of hexanediol, and 12.051 parts by weight of iosphthalic acid are slowly heated in a laboratory reactor at max. 220° C. until the acid number is less than 4. The product is then cooled to 80° C. and diluted with 24.025 parts by weight of methyl ethyl ketone.

1.2 Preparing the Nonionic Polyurethane Dispersion c)

29.155 parts by weight of the polyester precursor are introduced into a reactor, and 4.667 parts by weight of Carbowax MPEG 2000, 0.422 parts by weight of trimethylolpropane, 5.195 parts by weight of isophorone diisocyanate and 0.031 parts by weight of dibutyltin laurate are added. The reaction mixture is heated at 90° C. until the NCO content is in the range of 0.50 0.70%. Then, at 90° C., 0.367 parts by weight of neopentyl glycol and 0.281 parts by weight of trimethylolpropane are added. When the NCO value is less than 0.25%, 13.912 parts by weight of butyl glycol are added at a reactor temperature of 90° C. Subsequently, 45.97 parts by weight of deionized water are added to the reactor over the course of one hour at 70–90° C. with vigorous stirring, so giving the nonionic polyurethane dispersion c).

2. IMPLEMENTATION EXAMPLE 670 g of water, 30 g of nonionic polyurethane dispersion as per Preparation Example 1.2, 300 g of pulverized resin, 1.9 g of antifoam Troykyd D777 from Troy Chemical Co., 26.3 g of urethane thickener Acrysol RM8 from Rohm & Haas were weighed out in that order with stirring and the mixture was then treated in a dissolver (20 m/sec) for 10 min. This batch was subsequently dispersed in an SMC laboratory sand mill with grinding media for about 3½ h. The average particle size after grinding was 4 $\mu$m.

The millbase was admixed with 0.5% Byk 345 (silicone leveling agent), 10% strength aqueous DMEA solution for establishing a pH of 6.0, and adjusted with water to spray viscosity (300 mPas at 1000 s$^{-1}$).

3. COMPARATIVE EXAMPLE 670 g of water, 1.9 g of dispersant Orothan 731 K from Rohm & Haas, 0.19 g of Triton 100 from Rohm & Haas, 300 g of pulverized resin, 1.9 g of antifoam Troykyd D777 from Troy Chemical Co., 26.3 g of urethane thickener Acrysol RM8 from Rohm & Haas were weighed out in that order, with stirring, and then treated in a dissolver (20 m/sec) for 10 min. This batch was subsequently dispersed in an SMC laboratory sand mill with grinding media for about 3½ h. The average particle size after grinding was 5 $\mu$m.

The millbase was admixed with 0.5% Byk 345 (silicone leveling agent), 10% strength aqueous DMEA solution for establishing a pH of 6.0, and adjusted with water to spray viscosity (300 mPas at 1000 s$^{-1}$).

D. Application of Examples C2 and C3 (Comparative Example)

The silver metallic WBL (Würzburger System, PAT EP 0 228 003 B2 or DE 38 25 278 and subsequent patents) was applied in a dry film thickness of 12 $\mu$m to a surfacer-treated Bonder panel and dried at RT for 10 min and at 80° C. for 10 min. The powder slurry was subsequently applied wet on wet in a dry film thickness of from 40 to 50 $\mu$m and flashed off at RT for 10 min, predried at 50° C. for 6 min, and then baked at 145° C. for 30 min.

The clearcoat film from the implementation example C2 is notable for a markedly lower tendency to warp cracking. The semi-finished product (millbase) and the wet coating material have a lower sedimentation tendency than the wet coating materials of comparative example C3. Furthermore, the millbase batch possesses better thermal and shear stability.

We claim:

1. An aqueous powder clearcoat dispersion comprising a solid pulverulent component A and an aqueous component B, wherein solid pulverulent component A comprises a transparent powder coating material comprising
        a) at least one epoxy binder comprising from 25 to 45% by weight, of glycidyl-containing monomers,
        b) at least one crosslinking agent, and
        c) optionally one or more additives selected from the group consisting of catalysts, auxiliaries, additives typical for transparent powder coating materials, devolatilizers, leveling agents, UV absorbers, free-radical scavengers, antioxidants, and mixtures thereof, and component B comprises an aqueous dispersion comprising
        a) at least one nonionic thickener and
        b) optionally one or more additives selected from the group consisting of catalysts, auxiliaries, efoamers, wetting agents, antioxidants, UV absorbers, free-radical scavengers, biocides, solvent, leveling agents, neutralizing agents, amines, water retention agents, and mixtures thereof, and
        c) a dispersant medium in the form of a nonionic polyurethane dispersion.

2. The aqueous powder clearcoat dispersion of claim 1, comprising a pH between 4.0–7.0.

3. The aqueous powder clearcoat dispersion of claim 1, wherein the at least one epoxy binder a) comprises from 0 to not more than 35% by weight of vinylaromatice compounds.

4. The aqueous powder clearcoat dispersion of claim 1, wherein the at least one epoxy-functional binder is a polyacrylate resin containing epoxide groups, wherein said epoxide groups result from one or more epoxy-functional monomers selected from the group consisting of glycidyl acrylate, glycidyl methacrylate, allyl glycidyl ester and mixtures thereof.

5. The aqueous powder clearcoat dispersion of claim 1, having an average particle size of not more than 20 µm.

6. The aqueous powder clearcoat dispersion of claim 1, wherein the nonionic polyurethane dispersion c) comprises:
    1. at least one organic component comprising at least two reactive hydrogen atoms,
    2. a monofunctional polyether, and
    3. a polyisocyanate.

7. The aqueous powder clearcoat dispersion of claim 6, wherein the nonionic polyurethane dispersion c) comprises:
    1. at least one organic component comprising at least two reactive hydrogen atoms,
    2. a nonionic stabilizer, prepared by reacting
        i. a monofunctional polyether with a polyisocyanate-containing component, to produce an isocyanate intermediate, and
        ii. a component having at least two active amine groups and at least two active hydroxyl groups, and
    3. at least one polyisocyanate-containing component.

8. A process for preparing the aqueous powder clearcoat dispersion of claim 1, comprising
    I. preparing a dispersion from a solid pulverulent component A and an aqueous component B, component A comprising a transparent powder coating material comprising
        a) at least one epoxy binder from 25 to 45% by weight, of glycidyl-containing monomers,
        b) at least one crosslinking agent, and
        c) optionally one or more additives selected from the group consisting of catalysts, auxiliaries, additives typical for transparent powder coating materials, devolatilizers, leveling agents, UV absorbers, free-radical scavengers, antioxidants, and mixtures thereof, and
    component B comprises an aqueous dispersion comprising
        a) at least one nonionic thickener,
        b) optionally one or more additives selected from the group consisting of catalysts, auxiliaries, defoamers, dispersion auxiliaries, wetting agents, carboxy-functional dispersants, antioxidants, UV absorbers, leveling agents, neutralizing agents, amines, free-radical scavengers, biocides, and mixtures thereof, and
        c) a dispersant medium in the form of a nonionic polyurethane dispersion,
    II. optionally grinding the dispersion prepared from components A and B, and
    III. adjusting the dispersion to a pH of from 4.0 to 7.0, and filtering the dispersion.

9. The process of claim 8, further comprising wet grinding the aqueous powder clearcoat dispersion prepared from components A and B.

10. A process for coating painted and unpainted automobile bodies made of sheet metal and/or plastic by means of electrostatically assisted high-speed rotation or pneumatic application, comprising applying the aqueous powder clearcoat dispersion of claim 1.

11. The aqueous powder clearcoat dispersion of claim 1 wherein the at least one epoxy binder a) comprises from 30 to 35% by weight of glycidyl containing monomers.

12. The aqueous powder clearcoat dispersion of claim 1 wherein the at least one crosslinking agent b) is selected from the group consisting of straight-chain, aliphatic dicarboxylic acids, carboxy-functional polyesters, and mixtures thereof.

13. The aqueous powder clearcoat dispersion of claim 2, comprising a pH between 5.5 and 6.5.

14. The aqueous powder clearcoat dispersion of claim 3, wherein the at least one epoxy binder a) comprises from 10 to 25% by weight of vinylaromatice compounds.

15. The aqueous powder clearcoat dispersion of claim 3 wherein the vinylaromatic compound is styrene.

16. The aqueous powder clearcoat dispersion of claim 5, having an average particle size of from 3 to 10 µm.

* * * * *